United States Patent Office 3,702,315
Patented Nov. 7, 1972

3,702,315
HEAT SENSITIVE LATICES
Donald P. Knechtges, Grafton, and George J. Antlfinger, Avon Lake, Ohio, assignors to the B. F. Goodrich Company, New York, N.Y.
No Drawing. Continuation-in-part of application Ser. No. 798,466, Feb. 11, 1969. This application Oct. 21, 1970, Ser. No. 82,790
Int. Cl. C08f 45/24
U.S. Cl. 260—29.6 MQ
10 Claims

ABSTRACT OF THE DISCLOSURE

Synthetic latices are made heat-sensitive by the presence in the latex of a silicone polyether. The use of an organo-sulfonate in combination with a silicone polyether as a heat-sensitizing system for synthetic latices produces a heat-sensitive latex that is relatively stable at room temperature but that may be converted to a gel at a moderately low temperature. The silicone polyether when employed in combination with an organo-sulfonate compound may be used in significantly reduced amounts to impart heat-sensitivity to the latex as compared to the amounts of silicone polyether required as the heat-sensitizing additive without the additive.

CROSS REFERENCE TO RELATED APPLICATION

This is a continuation-in-part of our copending application Ser. No. 798,466, filed Feb. 11, 1969, now abandoned.

BACKGROUND OF THE INVENTION

It is known that some latices can be sensitized to heat by adding known heat-sensitizing additives to the latex. When heat is applied to such a latex the heat causes a phase inversion (often referred to as "gelation") to occur at a predetermined temperature. Unfortunately, many of the heat-sensitizing additives heretofore suggested render the latex objectionably unstable and even may cause gelation of the latex at room temperature if the latex is allowed to stand for too long a period of time without being used. Certain organo-polysiloxane latex heat-sensitizers do not appear to seriously destabilize the latex but must be present in large amounts in order to achieve the desired heat-sensitizing effect. Considering the high cost of such siloxane materials, the substantial amounts of these materials which must be used to impart the desired heat sensitivity to the latex has caused such sensitizers to be viewed as being economically impractical for many applications.

SUMMARY OF THE INVENTION

It now has been found that when the silicone polyethers are used in combination with certain organo-sulfonate emulsifier compounds, a significantly smaller amount of the silicone polyether is required in order to impart the desired degree of heat-sensitivity to latex. In accordance with the present invention, only from greater than 0.01 to 1.0 part by weight of the relatively expensive silicone polyether per 100 parts by weight of latex solids in combination with from greater than 5 total parts by weight of the organo-sulfonate emulsifier compound to 100 parts by weight of latex polymer solids is used to achieve the desired heat-sensitization. Decreased amounts of the silicone polyether may be used as compared to systems where the silicone polyether is used alone. The substantial reduction in the amount of the silicone polyether required to effect heat-sensitization of the latex when the silicone polyether is added to the latex with a sulfonate emulsifier compound permits the silicone polyethers to be used economically as commercial heat-sensitizers for synthetic latices. Improved results are obtained when the latex total solids is greater than 25% and the pH is less than 10.

DETAILED DESCRIPTION

The silicone polyethers useful as heat-sensitizers in accordance with this invention may be either soluble or unsoluble in water, although water-soluble silicone polyethers are more conveniently incorporated into the latex. Silicone polyethers having an inverse water solubility curve wherein the silicone polyether exhibits solubility in water at room temperature (25° C.) and water insolubility at a temperature moderately above room temperature are preferred. Silicone polyethers found to be particularly useful may be described as being a silicone-oxyalkylene block copolymer containing a butoxy-stopped ethylene-propylene glycol polymer attached to silicone atoms of methyl silicone through urethane linkages. A general formula for such silicone polyethers is:

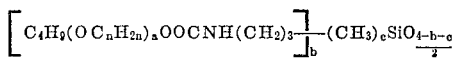

wherein $n$, $a$, $b$ and $c$ are integers, as described in U.S. Pats. Nos. 3,483,240 and 3,484,394.

The siloxane-oxyalkylene copolymer has the formula:

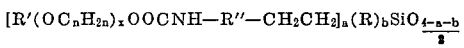

where R is an organic radical attached to silicon through a silicon-carbon linkage, R' is a member selected from the class consisting of lower alkyl radicals, e.g., alkyl radicals containing from 1 to 7 carbon atoms, and aryl radicals; R'' is a divalent hydrocarbon radical containing no more than about 7 carbon atoms; $a$ has a value of from 0.50 to 1.00, inclusive; $b$ has a value of from 1.12 to 1.90, inclusive; the sum of $a$ plus $b$ is equal to from 2.02 to 2.40, inclusive; $n$ has a value of from 2 to 4, inclusive; and $x$ has a value of at least 5, e.g., from 5 to 100 or more.

One of the preferred types of organohydrogenpolysiloxanes used in preparing the siloxane-oxyalkylene copolymers of the present invention are the triorganosilyl chain-stopped copolymers of diorganosiloxane units and organohydrogensiloxane units having the formula:

$$(R)_3SiO[(R)_2SiO]_p[(R)(H)SiO]_qSi(R)_3$$

where R is as previously defined, $p$ has an average value of from 0 to 45, inclusive, $q$ has a value at least as great as $p$ and from 3 to 48, inclusive, and the sum of $p$ plus $q$ is equal to from 3 to 48, inclusive, and where the sum of the silicon-bonded R groups plus the silicon-bonded hydrogen is equal to from 2.04 to 2.40 per silicon atom. In the preferred embodiment $p$ is 0 and all of the R groups are methyl.

Although from greater than 0.01 to 1.0 part by weight of the silicone polyether per 100 parts by weight of latex solids may be used in accordance with this invention, for optimum commercial adaptability from 0.1 to 0.5 part by weight of the silicone polyether per 100 parts by weight of latex solids is preferred.

The organo-sulfonate emulsifier compounds to be combined with the silicone polyether in accordance with this invention are water-soluble compounds having at least one sulfonate group attached to an aromatic ring and are represented by the formula

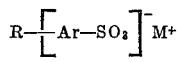

wherein R is alkyl having from 8 to 20 carbon atoms, an alkenyl chain having from 8 to 20 carbon atoms, and combinations of said chains with ethoxy chains, a phenyl radical (such as radicals represented by the structures

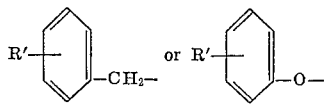

where R' is hydrogen, an alkyl chain having from 1 to 16 carbon atoms, or an alkenyl chain having from 1 to 16 carbon atoms), or an aryl radical having the structure

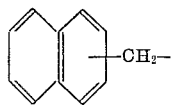

Ar is the benzene ring

or the naphthalene ring

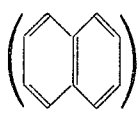

and M is an alkali metal or $NH_4$. Greater than 5 parts by weight of such organo-sulfonate compound per 100 parts by weight of latex solids should be used in combination with the silicone polyether to obtain the desired heat-sensitization. In commercial applications, normally no more than about 10 parts by weight of such organo-sulfonate emulsifier compound per 100 parts by weight of latex solids would be used even though the addition of greater amounts of the organo-sulfonate compound does not appear to decrease the effectiveness of the heat-sensitization. For practical commercial considerations about 6.0 to 15.0 total parts by weight of such organo-sulfonate emulsifier per 100 parts by weight of latex solids is preferred. Although the reason why a lesser amount of the silicone polyether is required when used in combination with the sulfonate compound to effect heat-sensitization is not fully understood, it is believed that the sulfonate compound reacts in solution with the silicone polyether and that the resulting complex compound, when the latex is heated, interacts with the latex particles or removes the protective soap from the latex particles to bring about the desired gelation.

The combination of the silicone polyethers and sulfonate compounds hereinabove described may be employed for sensitizing film forming synthetic latexes of vinylidene monomers containing at least one terminal $CH_2C<$ group, such as aqueous dispersions of rubbery polymers of open-chain conjugated diolefins having from four to eight carbon atoms exemplified by butadiene-1,3; isoprene, and the like, rubbery copolymers of these and similar conjugated diolefins with each other in amounts more than 50% or with at least 1% of copolymerizable monomeric materials containing a single $CH_2C<$ group; such as styrene, α-methyl styrene, alkyl acrylate as methyl acrylate, ethyl acrylate, methyl methacrylate, ethyl methacrylate, acrylonitrile, methacrylonitrile, acrylic and methacrylic acids, itaconic acid, vinyl ketones, vinyl ethers, vinyl esters, vinyl pyridine; and the like, polymers of alkyl acrylates wherein the alkyl group contains 1–10 carbon atoms and copolymers thereof with other vinylidene monomers; copolymers of more than 50% vinylidene chloride and more than 5% alkyl acrylate and the like. Such polymers and others are described in Vinyl and Related Polymers, Schildknecht (Wiley). Various emulsion polymerization processes are well known in the art such as those processes described in Whitby, "Synthetic Rubber" (John Wiley & Sons, 1954).

The total solids of the latexes treated as described may be varied quite widely but more normally for commercial purposes the latexes will contain greater than about 25 to about 75 weight percent total solids of polymer and more preferably from about 30 to about 65 weight percent. The pH of the latex has some effect on the temperature of gelation. Generally gelling occurs at lowest temperature at lowest pH consistent with a stable latex at room temperature. A pH below 10, and preferably below about 9 is usually maintained.

The organosulfonate is added to the latex before, during or after the latex has been compounded. While, as the examples show, the defined organo-sulfonates have been used as emulsifiers in polymerization reactions, it is not believed that any commercial latexes are made with as much as 6 weight parts of emulsifier per 100 weight parts of monomers. Therefore, in order to meet the requirements of this invention so that at least 6 weight parts of the organo-sulfonate be used along with less than one part of the silicone polyether, one normally adds additional organo-sulfonate. Of course, if the polymerization is conducted with one of the many other known protective agents other than the defined organo-sulfonates, it will be necessary to add at least 6 weight parts of the organo-sulfonate in order to achieve the advantages of this invention. The organo-sulfonate may be intermixed with the silicone polyether and this added as a mixture to the latex.

The following examples illustrate suitable methods of carrying out the present invention. However, it is understood that the examples are primarily illustrative and are not to be construed to limit the scope of invention.

In the examples, gel temperatures were determined by the following method. A latex is compounded having additives thereto as indicated. Fifteen milliliters of the compounded latex are placed into a 50 ml. test tube and said test tube is thereafter placed into a boiling hot water bath. A thermometer is placed inside the test tube for the purpose of recording the latex temperature and for the purpose of constantly stirring the latex. Upon gelation of the latex, the gel temperature is recorded.

EXAMPLE I

A synthetic latex was prepared from a monomer mixture of 53 parts (wt.) butadiene, 20 parts (wt.) acrylonitrile, 25 parts (wt.) styrene, 1 part (wt.) methacrylic acid, and 1 part (wt.) n-methylol acrylamide (wt.) in accordance with Example I of U.S. Pat. 3,344,103, and having a total polymer solids concentration of about 50% (wt.) and about 2 parts (wt.) of sulfonate emulsifier.

EXAMPLE II

The latex of Example I was sensitized as follows. About 5.0 grams (15 grams of water solution) of alkylarylsulfonate (Santomerse S) was added to about 100 grams of latex polymer solids (200 grams latex). About 0.1 gram (1.0 gram water solution) of silicone polyether (SF–1138) [1] was then added. After mixing, about 25 cc. of the now heat-sensitive latex mixture was poured into a 25 x 200 mm. test tube for the purpose of determining the gelation temperature. The test tube was immersed in boiling water to a depth greater than the height of latex mixture in the test tube. The latex mixture was stirred constantly with a thermometer until gelation occurred. The gel temperature of this particular composition was about 49° C. This heat sensitive latex was found to be suitable for producing latex articles, such as dip coatings, foams, saturants for thick webs, nonwoven and paper saturations, latex threads, thick films and the like.

---

[1] SF–1138 (General Electric) is a water soluble silicone polyether being a 1500 centistoke silicone-oxyalkylene block copolymer containing a butoxy-stopped ethylene-propylene glycol polymer attached to some of the silicone atoms of methyl silicone fluid through urethane linkages, of the formula:

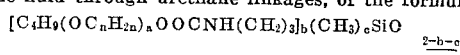

prepared as described in U.S. Pat. 3,484,394, col. 5.

The latex of Example I was adjusted to 40% total solids, 6 parts of Nekal BA-75 (α-naphthalene sulfonate) added along with 0.1 part of SF-1138. The pH of the latex was adjusted with 28% NH$_4$OH. At a latex pH of 8.3, the gel temperature was 55–57° C.; at 8.85, 63–64° C. and at pH 10.5, 76–77° C. and the polymer gel was very cheesy.

An alternative method of sensitizing the synthetic latex of Example I is as follows. About 5 grams (15 grams solution) of Santomerse S was intermixed with about 0.1 gram (1.0 gram solution of silicone polyether forming a solution mixture "A." Mixture "A" was then added to about 100 grams of latex solids (200 grams latex). Heat sensitizing characteristics were essentially the same as hereinbefore described.

EXAMPLE III

Emulsifier and silicone polyether (SF-1138) additions were made to the latex of Example I. Indicated below are weight additions per 100 parts (wt.) of latex polymer solids and corresponding gelation temperatures thereof.

| Emulsifier additions | Silicone polyether | Gel temp., °C. |
|---|---|---|
| (a) —0— | 1 | (¹) |
| (b) 5.0 Santomerse S | 0.1 | 49 |

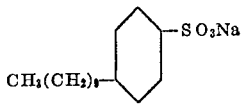

| | | |
|---|---|---|
| (c) 5.0 Santomerse S plus 4.0 Lomar PW | 0.5 | 39 |

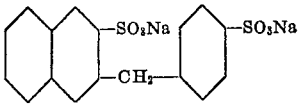

| | | |
|---|---|---|
| (d) 5.0 Sulfonate AA-10 | 0.5 | 46 |

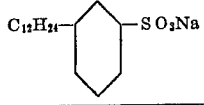

| | | |
|---|---|---|
| (e) 5.0 Naccanol NRSF | 0.5 | 48 |

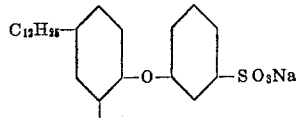

| | | |
|---|---|---|
| (f) 5.0 Benax 2A1 | 0.5 | 52 |

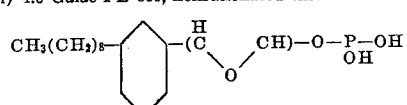

| | | |
|---|---|---|
| (g) 5.0 LAS; sodium salt of dodecylbenzene sulfonic acid | 0.5 | 53 |
| (h) 4.0 Abex 18S, non-sulfonated emulsifier; C$_{12}$H$_{25}$(OCH$_2$—CH$_2$)$_{50}$—OSO$_3$Na | 0.1 | (²) |
| (i) 4.0 Gafac PE-510, nonsulfonated emulsifier | 0.1 | (²) |

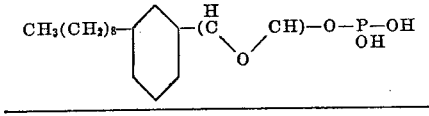

| | | |
|---|---|---|
| (j) 5.0 Sipon ES, non-sulfonated emulsifier; sodium salt of lauryl ether sulfate | 0.5 | (²) |

¹ Coag.  ² No gel.

EXAMPLE IV

The effect of various levels of emulsifier additions is shown, further illustrating the merits of this invention. Additions indicated are parts (wt.) per 100 parts (wt.) polymer solids of the latex of Example I.

| Emulsifier additions | Silicone polyether | Gel temp., °C. |
|---|---|---|
| (a) —0— | 1.0 | (¹) |
| (b) 2.0 Santomerse S | 1.0 | (³) |
| (c) 2.0 Santomerse S | 0.5 | (³) |
| (d) 3.0 Santomerse S | 1.0 | ² 55 |
| (e) 5.0 Santomerse S | 0.1 | 49 |
| (f) 5.0 Santomerse S | 0.5 | 42 |
| (g) 5.0 Santomerse S plus 4.0 Lomar PW | 0.5 | 39 |
| (h) 3.0 Sulfonate AA-10 | 0.5 | (³) |
| (i) 5.0 Sulfonate AA-10 | 0.1 | 85 |
| (j) 5.0 Sulfonate AA-10 | 0.5 | 55 |
| (k) 5.0 Nacconal NRSF | 0.1 | 69 |
| (l) 5.0 Nacconal NRSF | 0.5 | 51 |
| (m) 5.0 Benax 2A1 | 0.5 | 52 |
| (n) 2.0 LAS | 0.5 | (³) |
| (o) 5.0 LAS | 0.5 | 53 |

¹ Coag.  ² Unstable.  ³ No gel.

EXAMPLE V

A synthetic latex was prepared from a monomer mixture of about 52 parts (wt.) butadiene, 45 parts (wt.) styrene, and 3 parts (wt.) acrylic acid and interpolymerized in the presence of about 0.2 part (wt.) potassium persulfate and about 0.5 part (wt.) tertiary C-12 mercaptan, and having about 3.0 parts (wt.) sulfonate AA-10 at 50° C. The latex had a total polymer solids concentration of about 50% (wt.).

EXAMPLE VI

The latex of Example V was sensitized with emulsifier and silicone polyether (SF-1138) by addition of parts (wt.) indicated per 100 parts (wt.) of latex polymer solids.

| Emulsifier additions | Silicone polyether | Gel temp., °C. |
|---|---|---|
| (a) 0.0 | 0.5 | 92 |
| (b) 4.0 Santomerse S | 0.5 | 58 |
| (c) 0.0 (pH=5.7) | 0.5 | 90 |
| (d) 4.0 Santomerse S, 2.0 Sulfonate AA-10(pH=5.3) | 0.5 | 56 |
| (e) 4.0 non-sulfonate emulsifier (Sipex SB) CH$_3$(CH$_2$)$_{11}$OSO$_3$Na | 0.5 | (¹) |

¹ No gel.

EXAMPLE VII

A synthetic latex was prepared from about 100 parts (wt.) ethyl acrylate polymerized in water in the presence of about 0.5 part (wt.) of tetrasodium pyrophosphate and about 0.3 part (wt.) potassium persulfate. Latex had a total polymer solids content of about 50% (wt.).

EXAMPLE VIII

The latex of Example VII was sensitized with emulsifier and silicone polyether (SF-1138) by addition of parts (wt.) indicated per 100 parts (wt.) of latex polymer solids.

| Emulsifier additions | Silicone polyether | Gel temp., °C. |
|---|---|---|
| (a) 0.0 | 0.5 | 80 |
| (b) 7.0 Santomerse S | 0.5 | 37 |

EXAMPLE IX

A synthetic latex, being a copolymer of a major proportion of vinyl chloride with methyl acrylate and containing about 1 part (wt.) Santomerse S per 100 parts (wt.) latex polymer solids, was modified with about 35 parts (wt.) alkyl aryl phosphate plasticizer (Santicizer 141). Upon sensitizing with sulfonate emulsifiers and silicone polyether, favorable heat sensitizing characteristics were achieved comparable to results of examples recited hereinbefore.

Although specific embodiments of preferred compositions have been hereinbefore described, it is understood that obvious variations and modifications of the recited examples and those discernible by one skilled in the art are contemplated and are included within the spirit and scope of this invention as defined in the appended claims.

We claim:

1. A heat sensitive latex of a film-forming polymeric synthetic latex consisting essentially of vinylidene monomers having at least one terminal $CH_2=C<$ group, containing (1) a water soluble organosulfonate emulsifier having at least one aromatic ring and at least one $-SO_3$ group attached thereto of the formula

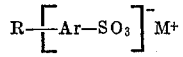

wherein R is alkyl or alkenyl containing 8 to 20 carbon atoms, or aryl, Ar is phenyl or naphthyl and M is an alkali metal, present in said latex in amounts of at least about 6 parts to less than about 20 parts by weight per 100 parts by weight of film-forming polymer, and (2) about 0.05 to less than one weight part per 100 weight parts of film-forming polymer of a silicone polyether of the formula $$[R'(OC_nH_{2n})_xOOCNH-R''-CH_2CH_2]_a(R)_bSiO_{\frac{4-a-b}{2}}$$

where R is an organic radical attached to silicon through a silicon-carbon linkage, R' is a member selected from the class consisting of lower alkyl radicals containing from 1 to 7 carbon atoms, and aryl radicals; R" is a divalent hydrocarbon radical containing no more than about 7 carbon atoms; $a$ has a value of from 0.50 to 1.00, inclusive; $b$ has a value of from 1.12 to 1.90, inclusive; the sum of $a$ plus $b$ is equal to from 2.02 to 2.40, inclusive; $n$ has a value of from 2 to 4, inclusive; and $x$ has a value of at least 5 to 100, at a pH below 10.

2. The heat sensitive latex of claim 1 wherein in the organosulfonate, R is a radical of the structure

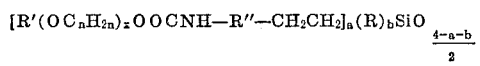

where R' is hydrogen, alkyl having from 1 to 16 carbon atoms, or an aryl radical having the structure

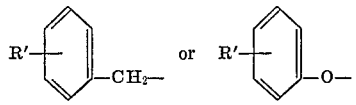

A is the benzene ring

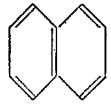

or naphthalene ring

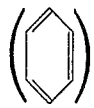

M is sodium or potassium and the silicone polyether is a silicone-oxyalkylene block copolymer containing a butoxy-stopped ethylene-propylene glycol polymer attached to silicone atoms of methyl silicone through urethane linkages.

3. The heat sensitive latex of claim 2 wherein the latex contains a polymer containing more than 50% of butadiene-1,3.

4. The heat sensitive latex of claim 2 wherein the polymer of the synthetic latex is a polymer containing a major proportion of an alkyl acrylate wherein the alkyl group contains 2 to 8 carbon atoms.

5. The heat sensitive latex of claim 2 wherein the organo-sulfonate emulsifier is selected from the group consisting of

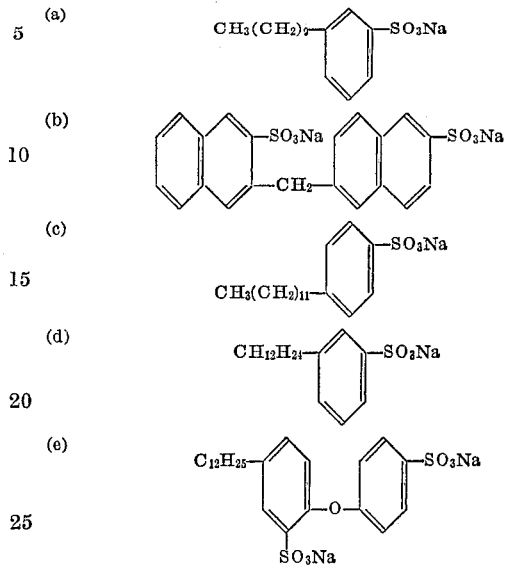

6. The heat sensitive latex of claim 5 wherein the polymer contains at least about 50% butadiene-1,3 and greater than 1% of at least one other vinylidene monomer containing a single terminal $CH_2=C<$ grouping.

7. The heat sensitive latex of claim 5 wherein the alkyl acrylate polymer contains greater than 50% alkyl acrylate and at least 1% of at least one other vinylidene monomer containing a single terminal $CH_2=C<$ grouping.

8. A heat sensitive latex of claim 2 wherein the polymer is a copolymer of butadiene-1,3 containing greater than 50% butadiene-1,3 and at least 1% of an acrylic acid or N-alkylol acrylamide and the organo-sulfonate has the formula

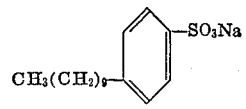

9. A heat sensitive latex of claim 2 wherein the polymer is a copolymer of an alkyl acrylate containing greater than 50% alkyl acrylate and at least 1% of an acrylic acid or N-alkylol acrylamide and the organo-sulfonate has the formula

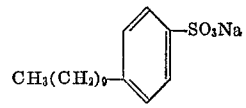

10. The heat sensitive latex of claim 2 wherein the amount of organo-sulfonate present is from about 6 to about 10 weight parts.

References Cited

UNITED STATES PATENTS

| | | | |
|---|---|---|---|
| 3,484,394 | 12/1969 | Holdstock | 260—29.6 R |
| 3,344,103 | 9/1967 | Eilbeck et al. | 260—29.7 T |
| 3,483,240 | 12/1969 | Boudreau | 260—448.2 B |

HAROLD D. ANDERSON, Primary Examiner

U.S. Cl. X.R.

117—161 KP, 161 OZ; 260—29.6 NR, 29.6 ME, 29.6 Z, 29.6 MN, 29.7 T, 29.7 SQ, 29.7 E, 29.7 NQ